(12) United States Patent
Dror et al.

(10) Patent No.: US 12,399,349 B2
(45) Date of Patent: Aug. 26, 2025

(54) MINIATURE TELEPHOTO LENS ASSEMBLY

(71) Applicant: Corephotonics Ltd., Tel Aviv (IL)

(72) Inventors: Michael Dror, Tel Aviv (IL); Ephraim Goldenberg, Tel Aviv (IL); Gal Shabtay, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

(21) Appl. No.: 19/063,340

(22) Filed: Feb. 26, 2025

(65) Prior Publication Data

US 2025/0208382 A1 Jun. 26, 2025

Related U.S. Application Data

(63) Continuation of application No. 18/938,337, filed on Nov. 6, 2024, which is a continuation of application No. 18/604,959, filed on Mar. 14, 2024, now Pat. No. 12,169,266, which is a continuation of application No. 18/504,395, filed on Nov. 8, 2023, now Pat. No. 11,953,659, which is a continuation of application No. 18/054,905, filed on Nov. 13, 2022, now Pat. No. 11,835,694, which is a continuation of application No. 17/499,878, filed on Oct. 13, 2021, now Pat. No. 12,072,475, which is a continuation of application No. 16/872,934, filed on May 12, 2020, now abandoned, which is a continuation of application No. 16/829,804, filed on Mar. 25, 2020, now Pat. No. 11,125,980, which is a continuation of application (Continued)

(51) Int. Cl.
| | | |
|---|---|---|
| G02B 13/02 | (2006.01) | |
| G02B 1/04 | (2006.01) | |
| G02B 9/60 | (2006.01) | |
| G02B 13/00 | (2006.01) | |
| G02B 27/00 | (2006.01) | |
| G02B 27/64 | (2006.01) | |
| G02B 5/00 | (2006.01) | |
| G02B 9/00 | (2006.01) | |
| H04N 101/00 | (2006.01) | |

(52) U.S. Cl.
CPC ......... *G02B 13/0045* (2013.01); *G02B 1/041* (2013.01); *G02B 9/60* (2013.01); *G02B 13/02* (2013.01); *G02B 27/0025* (2013.01); *G02B 27/646* (2013.01); *G02B 5/005* (2013.01); *G02B 9/00* (2013.01); *G02B 13/002* (2013.01); *H04N 2101/00* (2013.01); *H04N 2201/00* (2013.01); *Y10T 29/4913* (2015.01)

(58) Field of Classification Search
None
See application file for complete search history.

(56) References Cited

U.S. PATENT DOCUMENTS

2015/0029601 A1* 1/2015 Dror .................... G02B 13/009
359/764

* cited by examiner

*Primary Examiner* — Robert E. Tallman
(74) *Attorney, Agent, or Firm* — Nathan & Associates; Menachem Nathan

(57) ABSTRACT

An optical lens assembly includes five lens elements and provides a TTL/EFL<1.0. In an embodiment, the focal length of the first lens element f1<TTL/2, an air gap between first and second lens elements is smaller than half the second lens element thickness, an air gap between the third and fourth lens elements is greater than TTL/5 and an air gap between the fourth and fifth lens elements is smaller than about 1.5 times the fifth lens element thickness. All lens elements may be aspheric.

20 Claims, 6 Drawing Sheets

Related U.S. Application Data

No. 16/665,977, filed on Oct. 28, 2019, now Pat. No. 10,795,134, which is a continuation of application No. 16/296,272, filed on Mar. 8, 2019, now Pat. No. 10,488,630, which is a continuation of application No. 15/976,422, filed on May 10, 2018, now Pat. No. 10,317,647, and a continuation of application No. 15/976,391, filed on May 10, 2018, now Pat. No. 10,330,897, which is a continuation of application No. 15/817,235, filed on Nov. 19, 2017, now Pat. No. 10,324,277, which is a continuation of application No. 15/418,925, filed on Jan. 30, 2017, now Pat. No. 9,857,568, which is a continuation-in-part of application No. 15/170,472, filed on Jun. 1, 2016, now Pat. No. 9,568,712, which is a continuation of application No. 14/932,319, filed on Nov. 4, 2015, now Pat. No. 9,402,032, which is a continuation of application No. 14/367,924, filed as application No. PCT/IB2014/062465 on Jun. 20, 2014, now abandoned.

(60) Provisional application No. 61/842,987, filed on Jul. 4, 2013.

MINIATURE TELEPHOTO LENS ASSEMBLY

CROSS REFERENCE TO RELATED APPLICATIONS

This application is a continuation of U.S. patent application Ser. No. 18/938,337 filed Nov. 6, 2024 (now allowed), which was a continuation of U.S. patent application Ser. No. 18/604,959 filed Mar. 14, 2024, now U.S. Pat. No. 12,169,266, which was a continuation of U.S. patent application Ser. No. 18/504,395 filed Nov. 8, 2023, now U.S. Pat. No. 11,953,659, which was a continuation of U.S. patent application Ser. No. 18/054,905 filed Nov. 13, 2022, now U.S. Pat. No. 11,835,694, which was a continuation of U.S. patent application Ser. No. 17/499,878 filed Oct. 13, 2021, now U.S. Pat. No. 12,072,475, which was a continuation of U.S. patent application Ser. No. 16/872,934 filed May 12, 2020, now abandoned, which was a continuation of U.S. patent application Ser. No. 16/829,804 filed Mar. 25, 2020, now U.S. Pat. No. 11,125,980, which was a continuation of U.S. patent application Ser. No. 16/665,977 filed Oct. 28, 2019, now U.S. Pat. No. 10,795,134, which was a continuation of U.S. patent application Ser. No. 16/296,272 filed Mar. 8, 2019, now U.S. Pat. No. 10,488,630, which was a continuation of U.S. patent application Ser. No. 15/976,391, now U.S. Pat. No. 10,330,897, and Ser. No. 15/976,422, now U.S. Pat. No. 10,317,647 filed May 10, 2018, which were a continuation of U.S. patent application Ser. No. 15/817,235 filed Nov. 19, 2017, now U.S. Pat. No. 10,324,277, which was a continuation of U.S. patent application Ser. No. 15/418,925 filed Jan. 30, 2017, now U.S. Pat. No. 9,857,568, which was a continuation in part of U.S. patent application Ser. No. 15/170,472 filed Jun. 1, 2016, now U.S. Pat. No. 9,568,712, which was a continuation of U.S. patent application Ser. No. 14/932,319 filed Nov. 4, 2015, now U.S. Pat. No. 9,402,032, which was a continuation of U.S. patent application Ser. No. 14/367,924 filed Sep. 19, 2014, now abandoned, which was a 371 of international application PCT/IB2014/062465 filed Jun. 20, 2014, and is related to and claims priority from U.S. Provisional Patent Application No. 61/842,987 filed Jul. 4, 2013, which is incorporated herein by reference in its entirety.

FIELD

Embodiments disclosed herein relate to an optical lens system and lens assembly, and more particularly, to a miniature telephoto lens assembly included in such a system and used in a portable electronic product such as a cellphone.

BACKGROUND

Digital camera modules are currently being incorporated into a variety of host devices. Such host devices include cellular telephones, personal data assistants (PDAs), computers, and so forth. Consumer demand for digital camera modules in host devices continues to grow. Cameras in cellphone devices in particular require a compact imaging lens system for good quality imaging and with a small total track length (TTL). Conventional lens assemblies comprising four lens elements are no longer sufficient for good quality imaging in such devices. The latest lens assembly designs, e.g. as in U.S. Pat. No. 8,395,851, use five lens elements. However, the design in U.S. Pat. No. 8,395,851 suffers from at least the fact that the TTL/EFL (effective focal length) ratio is too large.

Therefore, a need exists in the art for a five lens element optical lens assembly that can provide a small TTL/EFL ratio and better image quality than existing lens assemblies.

SUMMARY

Embodiments disclosed herein refer to an optical lens assembly comprising, in order from an object side to an image side: a first lens element with positive refractive power having a convex object-side surface, a second lens element with negative refractive power having a thickness $d_2$ on an optical axis and separated from the first lens element by a first air gap, a third lens element with negative refractive power and separated from the second lens element by a second air gap, a fourth lens element having a positive refractive power and separated from the third lens element by a third air gap, and a fifth lens element having a negative refractive power, separated from the fourth lens element by a fourth air gap, the fifth lens element having a thickness $d_5$ on the optical axis.

An optical lens system incorporating the lens assembly may further include a stop positioned before the first lens element, a glass window disposed between the image-side surface of the fifth lens element and an image sensor with an image plane on which an image of the object is formed.

The effective focal length of the lens assembly is marked "EFL" and the total track length on an optical axis between the object-side surface of the first lens element and the electronic sensor is marked "TTL". In all embodiments, TTL is smaller than the EFL, i.e. the TTL/EFL ratio is smaller than 1.0. In some embodiments, the TTL/EFL ratio is smaller than 0.9. In an embodiment, the TTL/EFL ratio is about 0.85. In all embodiments, the lens assembly has an F number F #<3.2. In an embodiment, the focal length of the first lens element f1 is smaller than TTL/2, the first, third and fifth lens elements have each an Abbe number ("Vd") greater than 50, the second and fourth lens elements have each an Abbe number smaller than 30, the first air gap is smaller than $d_2/2$, the third air gap is greater than TTL/5 and the fourth air gap is smaller than $1.5d_5$. In some embodiments, the surfaces of the lens elements may be aspheric.

In an optical lens assembly disclosed herein, the first lens element with positive refractive power allows the TTL of the lens system to be favorably reduced. The combined design of the first, second and third lens elements plus the relative short distances between them enable a long EFL and a short TTL. The same combination, together with the high dispersion (low Vd) for the second lens element and low dispersion (high Vd) for the first and third lens elements, also helps to reduce chromatic aberration. In particular, the ratio TTL/EFL<1.0 and minimal chromatic aberration are obtained by fulfilling the relationship $1.2\times|f3|>|f2|>1.5\times f1$, where "f" indicates the lens element effective focal length and the numerals 1, 2, 3, 4, 5 indicate the lens element number.

The conditions TTL/EFL<1.0 and F #<3.2 can lead to a large ratio L11/L1e (e.g. larger than 4) between the largest width (thickness) L11 and the smallest width (thickness) of the first lens element (facing the object) L1e. The largest width is along the optical axis and the smallest width is of a flat circumferential edge of the lens element. L11 and L1e are shown in each of elements 102, 202 and 302. A large L11/L1e ratio (e.g. >4) impacts negatively the manufacturability of the lens and its quality. Advantageously, the present inventors have succeeded in designing the first lens element to have a L11/L1e ratio smaller than 4, smaller than 3.5, smaller than 3.2, smaller than 3.1 (respectively 3.01 for element 102 and 3.08 for element 302) and even smaller than 3.0 (2.916 for element 202). The significant reduction in the L11/L1e ratio improves the manufacturability and increases the quality of lens assemblies disclosed herein.

The relatively large distance between the third and the fourth lens elements plus the combined design of the fourth and fifth lens elements assist in bringing all fields' focal points to the image plane. Also, because the fourth and fifth lens elements have different dispersions and have respectively positive and negative power, they help in minimizing chromatic aberration.

DETAILED DESCRIPTION

Figure 1A:
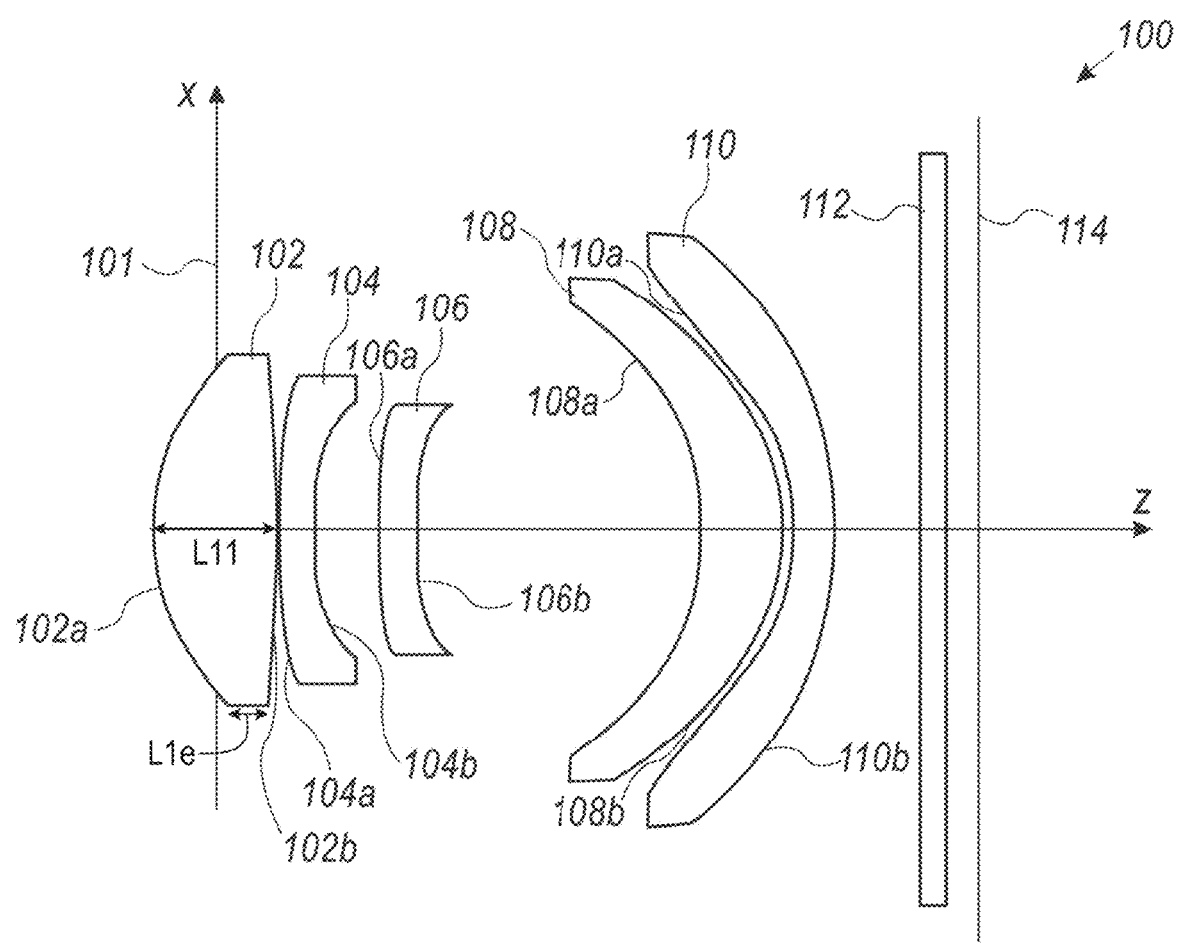
FIG. 1A shows a first embodiment of an optical lens system disclosed herein.
Figure 1B:
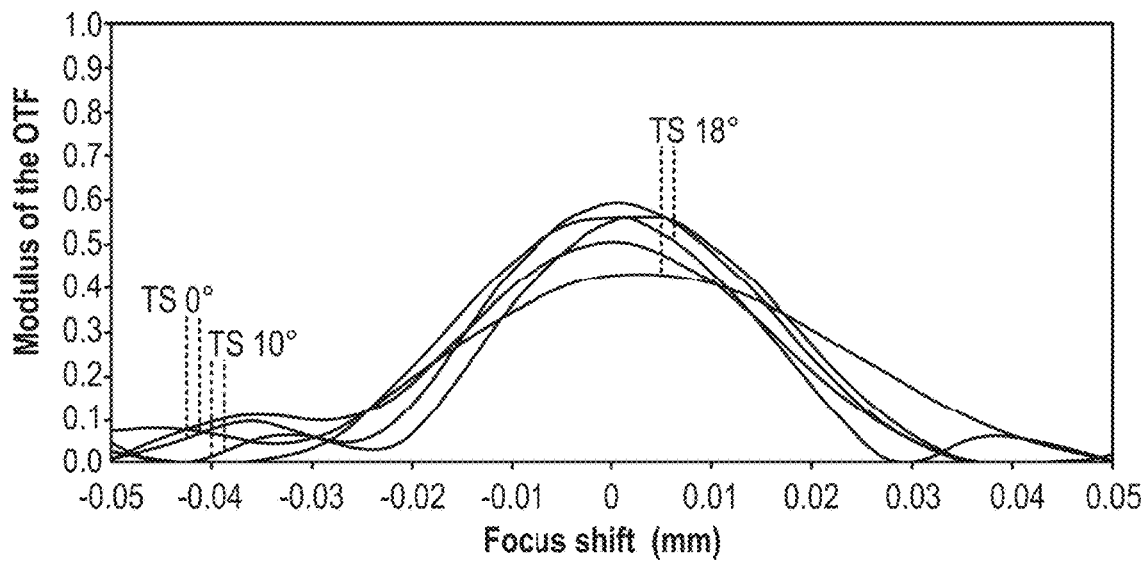
FIG. 1B shows the modulus of the optical transfer function (MTF) vs. focus shift of the entire optical lens assembly for various fields in the first embodiment.
Figure 1C:
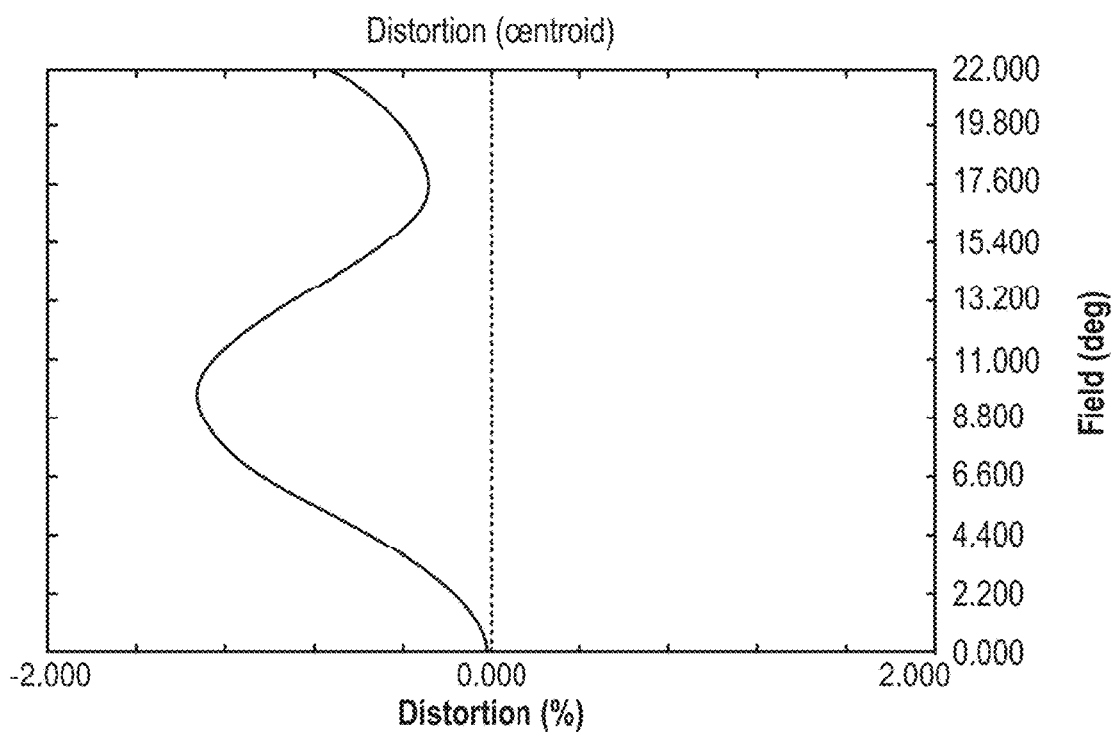
FIG. 1C shows the distortion vs. field angle (+Y direction) in percent in the first embodiment.

In the following description, the shape (convex or concave) of a lens element surface is defined as viewed from the respective side (i.e. from an object side or from an image side). FIG. 1A shows a first embodiment of an optical lens system disclosed herein and marked 100. FIG. 1B shows the MTF vs. focus shift of the entire optical lens system for various fields in embodiment 100. FIG. 1C shows the distortion +Y in percent vs. field. Embodiment 100 comprises in order from an object side to an image side: an optional stop 101; a first plastic lens element 102 with positive refractive power having a convex object-side surface 102a and a convex or concave image-side surface 102b; a second plastic lens element 104 with negative refractive power and having a meniscus convex object-side surface 104a, with an image side surface marked 104b; a third plastic lens element 106 with negative refractive power having a concave object-side surface 106a with an inflection point and a concave image-side surface 106b; a fourth plastic lens element 108 with positive refractive power having a positive meniscus, with a concave object-side surface marked 108a and an image-side surface marked 108b; and a fifth plastic lens element 110 with negative refractive power having a negative meniscus, with a concave object-side surface marked 110a and an image-side surface marked 110b. The optical lens system further comprises an optional glass window 112 disposed between the image-side surface 110b of fifth lens element 110 and an image plane 114 for image formation of an object. Moreover, an image sensor (not shown) is disposed at image plane 114 for the image formation.

In embodiment 100, all lens element surfaces are aspheric. Detailed optical data is given in Table 1, and the aspheric surface data is given in Table 2, wherein the units of the radius of curvature (R), lens element thickness and/or distances between elements along the optical axis and diameter are expressed in mm. "Nd" is the refraction index. The equation of the aspheric surface profiles is expressed by:

$$z = \frac{cr^2}{1+\sqrt{1-(1+k)c^2r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14}$$

where r is distance from (and perpendicular to) the optical axis, k is the conic coefficient, c=1/R where R is the radius of curvature, and a are coefficients given in Table 2. In the equation above as applied to embodiments of a lens assembly disclosed herein, coefficients $\alpha_1$ and $\alpha_7$ are zero. Note that the maximum value of r "max r"=Diameter/2. Also note that Table 1 (and in Tables 3 and 5 below), the distances between various elements (and/or surfaces) are marked "Lmn" (where m refers to the lens element number, n=1 refers to the element thickness and n=2 refers to the air gap to the next element) and are measured on the optical axis z, wherein the stop is at z=0. Each number is measured from the previous surface. Thus, the first distance −0.466 mm is measured from the stop to surface 102a, the distance L11 from surface 102a to surface 102b (i.e. the thickness of first lens element 102) is 0.894 mm, the gap L12 between surfaces 102b and 104a is 0.020 mm, the distance L21 between surfaces 104a and 104b (i.e. thickness $d_2$ of second lens element 104) is 0.246 mm, etc. Also, L21=$d_2$ and L51=$d_5$. L11 for lens element 102 is indicated in FIG. 1A. Also indicated in FIG. 1A is a width L1e of a flat circumferential edge (or surface) of lens element 102. L11 and L1e are also indicated for each of first lens elements 202 and 302 in, respectively, embodiments 200 (FIG. 2A) and 300 (FIG. 3A).

TABLE 1

| # | Comment | Radius R [mm] | Distances [mm] | Nd/Vd | Diameter [mm] |
|---|---------|---------------|----------------|-------|---------------|
| 1 | Stop | Infinite | −0.466 | | 2.4 |
| 2 | L11 | 1.5800 | 0.894 | 1.5345/57.095 | 2.5 |
| 3 | L12 | −11.2003 | 0.020 | | 2.4 |
| 4 | L21 | 33.8670 | 0.246 | 1.63549/23.91 | 2.2 |
| 5 | L22 | 3.2281 | 0.449 | | 1.9 |
| 6 | L31 | −12.2843 | 0.290 | 1.5345/57.095 | 1.9 |
| 7 | L32 | 7.7138 | 2.020 | | 1.8 |
| 8 | L41 | −2.3755 | 0.597 | 1.63549/23.91 | 3.3 |
| 9 | L42 | −1.8801 | 0.068 | | 3.6 |
| 10 | L51 | −1.8100 | 0.293 | 1.5345/57.095 | 3.9 |
| 11 | L52 | −5.2768 | 0.617 | | 4.3 |
| 12 | Window | Infinite | 0.210 | 1.5168/64.17 | 3.0 |
| 13 | | Infinite | 0.200 | | 3.0 |

TABLE 2

| # | Conic coefficient k | $\alpha_2$ | $\alpha_3$ | $\alpha_4$ | $\alpha_5$ | $\alpha_6$ |
|---|---|---|---|---|---|---|
| 2 | −0.4668 | 7.9218E−03 | 2.3146E−02 | −3.3436E−02 | 2.3650E−02 | −9.2437E−03 |
| 3 | −9.8525 | 2.0102E−02 | 2.0647E−04 | 7.4394E−03 | −1.7529E−02 | 4.5206E−03 |
| 4 | 10.7569 | −1.9248E−03 | 8.6003E−02 | 1.1676E−02 | −4.0607E−02 | 1.3545E−02 |
| 5 | 1.4395 | 5.1029E−03 | 2.4578E−01 | −1.7734E−01 | 2.9848E−01 | −1.3320E−01 |
| 6 | 0.0000 | 2.1629E−01 | 4.0134E−01 | 1.3615E−02 | 2.5914E−03 | −1.2292E−02 |
| 7 | −9.8953 | 2.3297E−01 | 8.2917E−02 | −1.2725E−01 | 1.5691E−01 | −5.9624E−02 |
| 8 | 0.9938 | −1.3522E−02 | −7.0395E−03 | 1.4569E−02 | −1.5336E−02 | 4.3707E−03 |
| 9 | −6.8097 | −1.0654E−01 | 1.2933E−02 | 2.9548E−04 | −1.8317E−03 | 5.0111E−04 |
| 10 | −7.3161 | −1.8636E−01 | 8.3105E−02 | −1.8632E−02 | 2.4012E−03 | −1.2816E−04 |
| 11 | 0.0000 | −1.1927E−01 | 7.0245E−02 | −2.0735E−02 | 2.6418E−03 | −1.1576E−04 |

Embodiment 100 provides a field of view (FOV) of 44 degrees, with EFL=6.90 mm, F #=2.80 and TTL of 5.904 mm. Thus and advantageously, the ratio TTL/EFL=0.855. Advantageously, the Abbe number of the first, third and fifth lens element is 57.095. Advantageously, the first air gap between lens elements 102 and 104 (the gap between surfaces 102b and 104a) has a thickness (0.020 mm) which is less than a tenth of thickness $d_2$ (0.246 mm). Advantageously, the Abbe number of the second and fourth lens elements is 23.91. Advantageously, the third air gap between lens elements 106 and 108 has a thickness (2.020 mm) greater than TTL/5 (5.904/5 mm). Advantageously, the fourth air gap between lens elements 108 and 110 has a thickness (0.068 mm) which is smaller than $1.5d_5$ (0.4395 mm).

The focal length (in mm) of each lens element in embodiment 100 is as follows: f1=2.645, f2=−5.578, f3=−8.784, f4=9.550 and f5=−5.290. The condition 1.2×|f3|>|f2|<1.5×f1 is clearly satisfied, as 1.2×8.787>5.578>1.5×2.645. f1 also fulfills the condition f1<TTL/2, as 2.645<2.952.

Using the data from row #2 in Tables 1 and 2, L1e in lens element 102 equals 0.297 mm, yielding a center-to-edge thickness ratio L1l/L1e of 3.01.

Figure 2A:
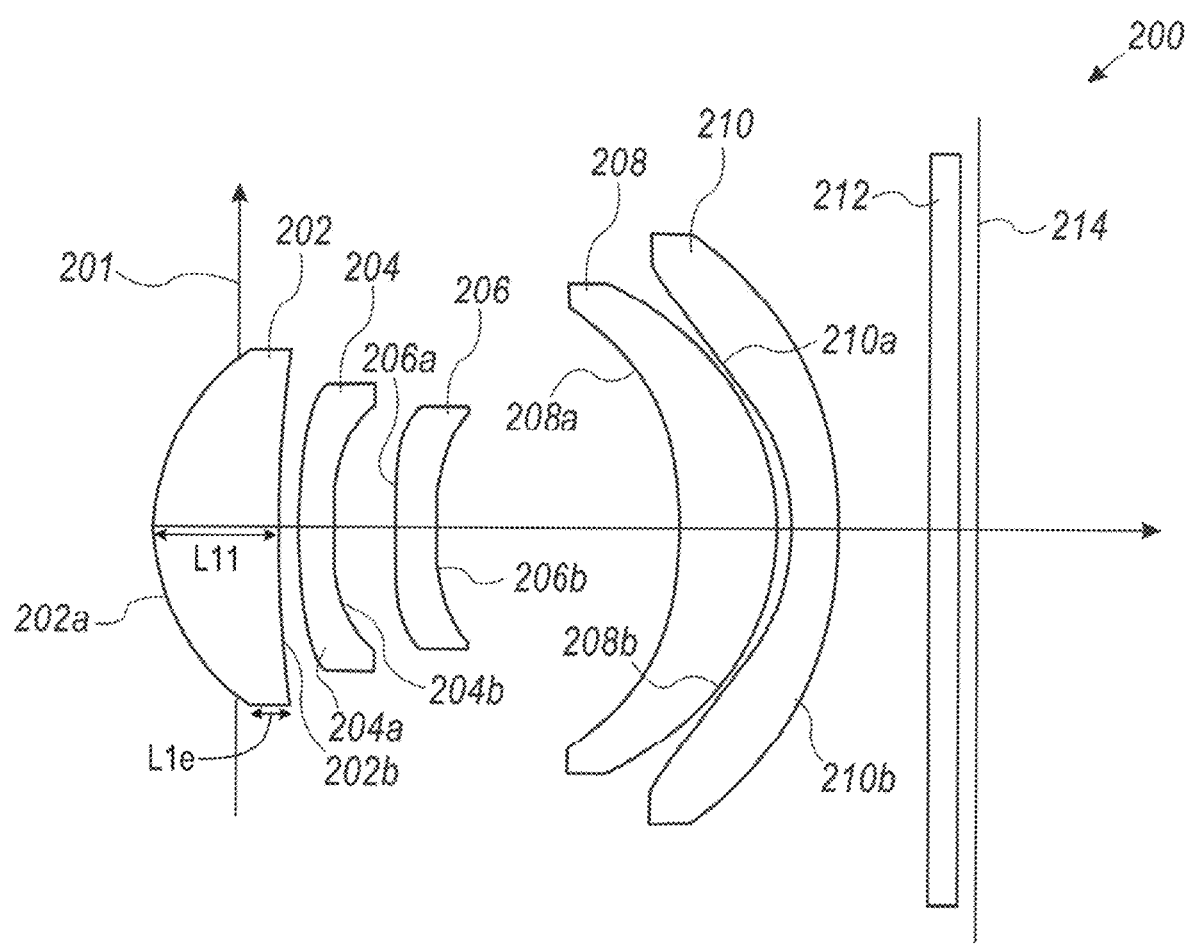
FIG. 2A shows a second embodiment of an optical lens system disclosed herein.
Figure 2B:
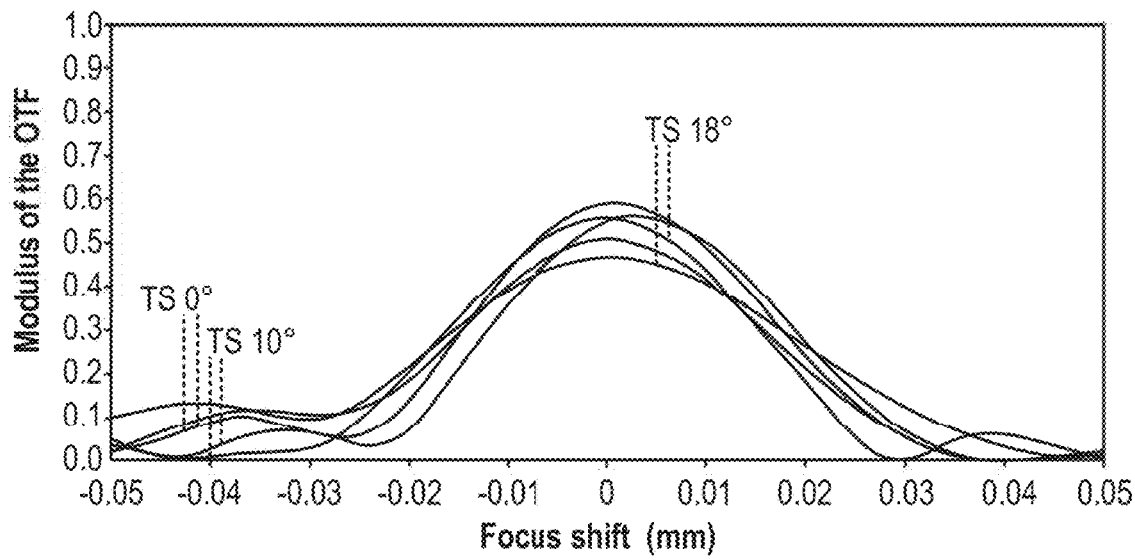
FIG. 2B shows the MTF vs. focus shift of the entire optical lens assembly for various fields in the second embodiment.
Figure 2C:
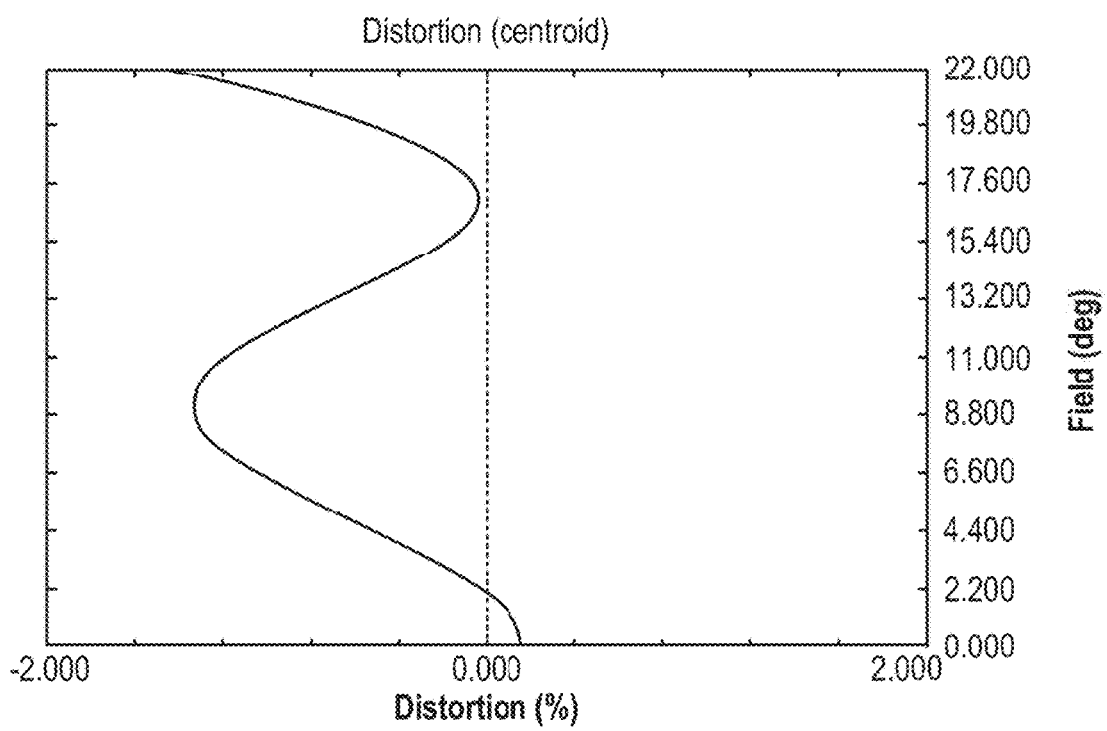
FIG. 2C shows the distortion +Y in percent in the second embodiment.
Figure 3A:
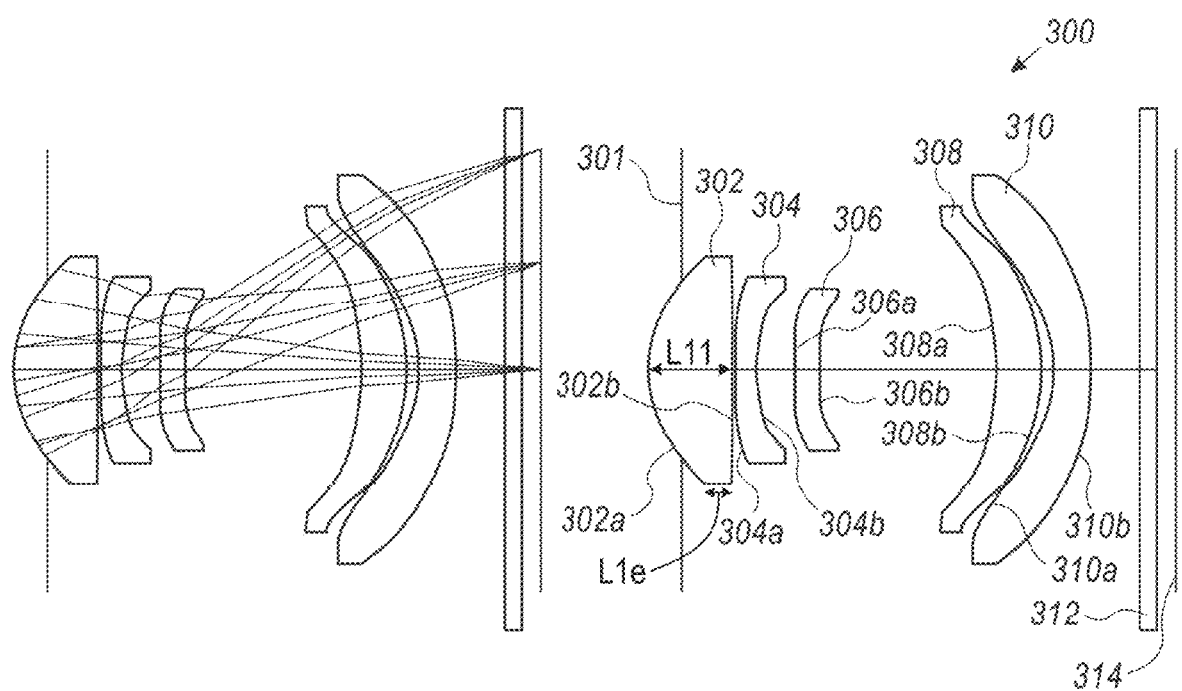
FIG. 3A shows a third embodiment of an optical lens system disclosed herein.

FIG. 2A shows a second embodiment of an optical lens system disclosed herein and marked 200. FIG. 2B shows the MTF vs. focus shift of the entire optical lens system for various fields in embodiment 200. FIG. 2C shows the distortion +Y in percent vs. field. Embodiment 200 comprises in order from an object side to an image side: an optional stop 201; a first plastic lens element 202 with positive refractive power having a convex object-side surface 202a and a convex or concave image-side surface 202b; a second glass lens element 204 with negative refractive power, having a meniscus convex object-side surface 204a, with an image side surface marked 204b; a third plastic lens element 206 with negative refractive power having a concave object-side surface 206a with an inflection point and a concave image-side surface 206b; a fourth plastic lens element 208 with positive refractive power having a positive meniscus, with a concave object-side surface marked 208a and an image-side surface marked 208b; and a fifth plastic lens element 210 with negative refractive power having a negative meniscus, with a concave object-side surface marked 110a and an image-side surface marked 210b. The optical lens system further comprises an optional glass window 212 disposed between the image-side surface 210b of fifth lens element 210 and an image plane 214 for image formation of an object.

In embodiment 200, all lens element surfaces are aspheric. Detailed optical data is given in Table 3, and the aspheric surface data is given in Table 4, wherein the markings and units are the same as in, respectively, Tables 1 and 2. The equation of the aspheric surface profiles is the same as for embodiment 100.

TABLE 3

| # | Comment | Radius R [mm] | Distances [mm] | Nd/Vd | Diameter [mm] |
|---|---|---|---|---|---|
| 1 | Stop | Infinite | −0.592 | | 2.5 |
| 2 | L11 | 1.5457 | 0.898 | 1.53463/56.18 | 2.6 |
| 3 | L12 | −127.7249 | 0.129 | | 2.6 |
| 4 | L21 | 6.6065 | 0.251 | 1.91266/20.65 | 2.1 |
| 5 | L22 | 2.8090 | 0.443 | | 1.8 |
| 6 | L31 | 9.6183 | 0.293 | 1.53463/56.18 | 1.8 |
| 7 | L32 | 3.4694 | 1.766 | | 1.7 |
| 8 | L41 | −2.6432 | 0.696 | 1.632445/23.35 | 3.2 |
| 9 | L42 | −1.8663 | 0.106 | | 3.6 |
| 10 | L51 | −1.4933 | 0.330 | 1.53463/56.18 | 3.9 |
| 11 | L52 | −4.1588 | 0.649 | | 4.3 |
| 12 | Window | Infinite | 0.210 | 1.5168/64.17 | 5.4 |
| 13 | Infinite | 0.130 | 5.5 | | |

TABLE 4

| # | Conic coefficient k | $\alpha_2$ | $\alpha_3$ | $\alpha_4$ | $\alpha_5$ | $\alpha_6$ |
|---|---|---|---|---|---|---|
| 2 | 0.0000 | −2.7367E−03 | 2.8779E−04 | −4.3661E−03 | 3.0069E−03 | −1.2282E−03 |
| 3 | −10.0119 | 4.0790E−02 | −1.8379E−02 | 2.2562E−02 | −1.7706E−02 | 4.9640E−03 |
| 4 | 10.0220 | 4.6151E−02 | 5.8320E−02 | −2.0919E−02 | −1.2846E−02 | 8.8283E−03 |
| 5 | 7.2902 | 3.6028E−02 | 1.1436E−01 | −1.9022E−02 | 4.7992E−03 | −3.4079E−03 |
| 6 | 0.0000 | 1.6639E−01 | 5.6754E−02 | −1.2238E−02 | −1.8648E−02 | 1.9292E−02 |
| 7 | 8.1261 | 1.5353E−01 | 8.1427E−02 | −1.5773E−01 | 1.5303E−01 | −4.6064E−02 |
| 8 | 0.0000 | −3.2628E−02 | 1.9535E−02 | −1.6716E−02 | −2.0132E−03 | 2.0112E−03 |
| 9 | 0.0000 | 1.5173E−02 | −1.2252E−02 | 3.3611E−03 | −2.5303E−03 | 8.4038E−04 |
| 10 | −4.7688 | −1.4736E−01 | 7.6335E−02 | −2.5539E−02 | 5.5897E−03 | −5.0290E−04 |
| 11 | 0.00E+00 | −8.3741E−02 | 4.2660E−02 | −8.4866E−03 | 1.2183E−04 | 7.2785E−05 |

Embodiment 200 provides a FOV of 43.48 degrees, with EFL=7 mm, F #=2.86 and TTL=5.90 mm. Thus and advantageously, the ratio TTL/EFL=0.843. Advantageously, the Abbe number of the first, third and fifth lens elements is 56.18. The first air gap between lens elements 202 and 204 has a thickness (0.129 mm) which is about half the thickness $d_2$ (0.251 mm). Advantageously, the Abbe number of the second lens element is 20.65 and of the fourth lens element is 23.35. Advantageously, the third air gap between lens elements 206 and 208 has a thickness (1.766 mm) greater than TTL/5 (5.904/5 mm). Advantageously, the fourth air gap between lens elements 208 and 210 has a thickness (0.106 mm) which is less than $1.5 \times d_5$ (0.495 mm).

The focal length (in mm) of each lens element in embodiment 200 is as follows: f1=2.851, f2=−5.468, f3=−10.279, f4=7.368 and f5=−4.536. The condition $1.2 \times |f3| > |f2| < 1.5 \times f1$ is clearly satisfied, as $1.2 \times 10.279 > 5.468 > 1.5 \times 2.851$. f1 also fulfills the condition f1<TTL/2, as 2.851<2.950.

Using the data from row #2 in Tables 3 and 4, L1e in lens element 202 equals 0.308 mm, yielding a center-to-edge thickness ratio L11/L1e of 2.916.

Figure 3B:
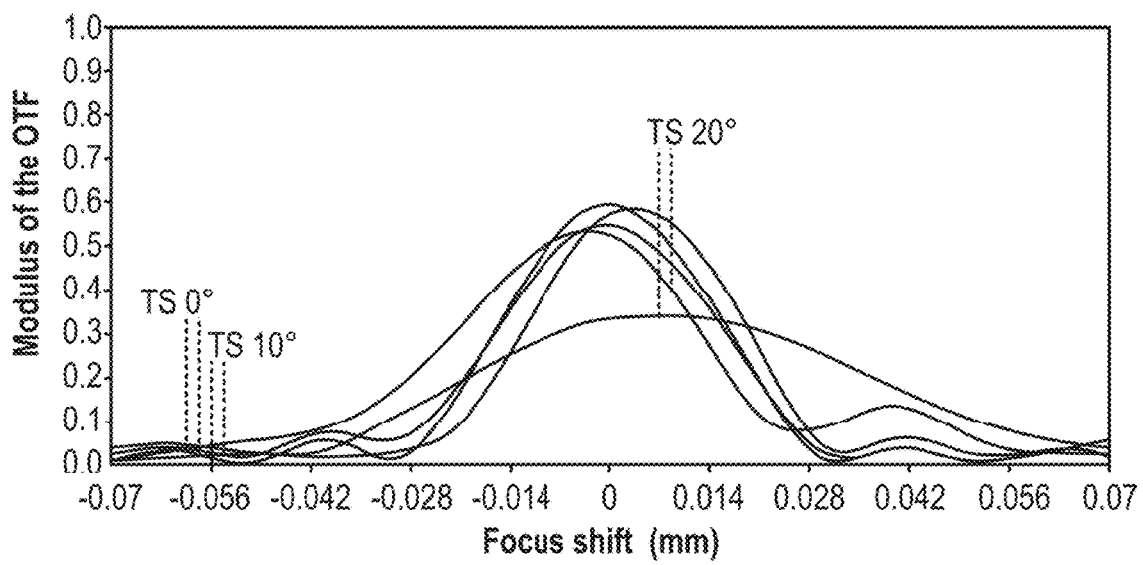
FIG. 3B shows the MTF vs. focus shift of the entire optical lens system for various fields in the third embodiment.
Figure 3C:
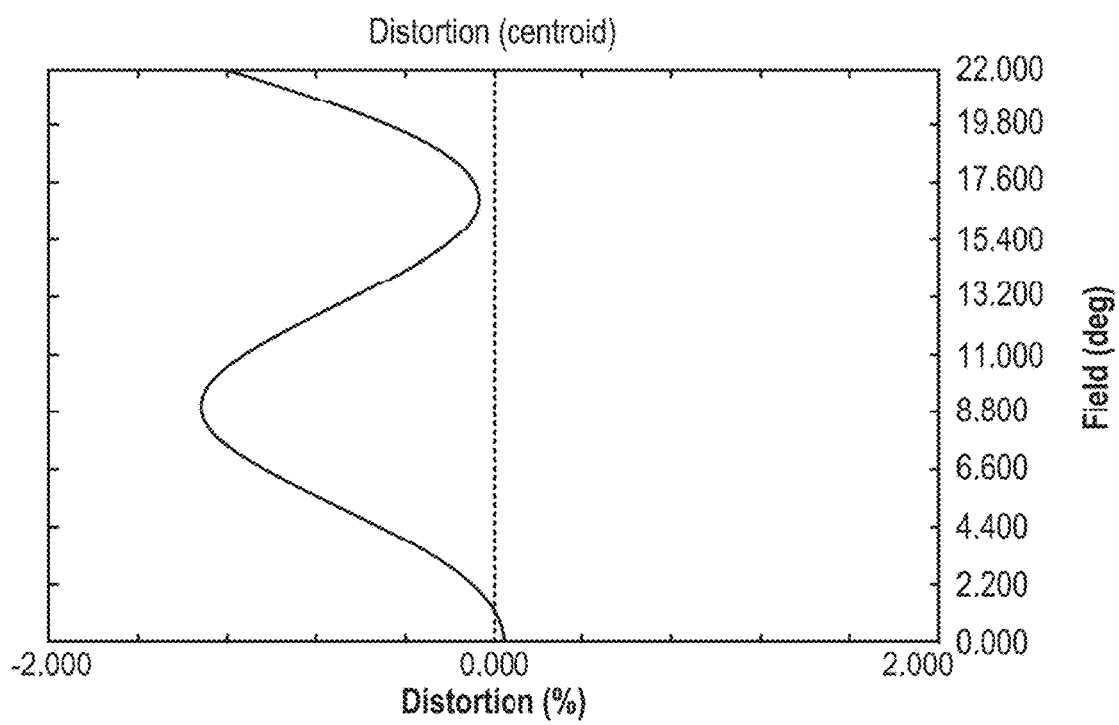
FIG. 3C shows the distortion +Y in percent in the third embodiment.

FIG. 3A shows a third embodiment of an optical lens system disclosed herein and marked 300. FIG. 3B shows the MTF vs. focus shift of the entire optical lens system for various fields in embodiment 300. FIG. 3C shows the distortion +Y in percent vs. field. Embodiment 300 comprises in order from an object side to an image side: an optional stop 301; a first glass lens element 302 with positive refractive power having a convex object-side surface 302a and a convex or concave image-side surface 302b; a second plastic lens element 204 with negative refractive power, having a meniscus convex object-side surface 304a, with an image side surface marked 304b; a third plastic lens element 306 with negative refractive power having a concave object-side surface 306a with an inflection point and a concave image-side surface 306b; a fourth plastic lens element 308 with positive refractive power having a positive meniscus, with a concave object-side surface marked 308a and an image-side surface marked 308b; and a fifth plastic lens element 310 with negative refractive power having a negative meniscus, with a concave object-side surface marked 310a and an image-side surface marked 310b. The optical lens system further comprises an optional glass window 312 disposed between the image-side surface 310b of fifth lens element 310 and an image plane 314 for image formation of an object.

In embodiment 300, all lens element surfaces are aspheric. Detailed optical data is given in Table 5, and the aspheric surface data is given in Table 6, wherein the markings and units are the same as in, respectively, Tables 1 and 2. The equation of the aspheric surface profiles is the same as for embodiments 100 and 200.

TABLE 5

| # | Comment | Radius R [mm] | Distances [mm] | Nd/Vd | Diameter [mm] |
|---|---|---|---|---|---|
| 1 | Stop | Infinite | −0.38 | | 2.4 |
| 2 | L11 | 1.5127 | 0.919 | 1.5148/63.1 | 2.5 |
| 3 | L12 | −13.3831 | 0.029 | | 2.3 |
| 4 | L21 | 8.4411 | 0.254 | 1.63549/23.91 | 2.1 |
| 5 | L22 | 2.6181 | 0.426 | | 1.8 |
| 6 | L31 | −17.9618 | 0.265 | 1.5345/57.09 | 1.8 |
| 7 | L32 | 4.5841 | 1.998 | | 1.7 |
| 8 | L41 | −2.8827 | 0.514 | 1.63549/23.91 | 3.4 |
| 9 | L42 | −1.9771 | 0.121 | | 3.7 |
| 10 | L51 | −1.8665 | 0.431 | 1.5345/57.09 | 4.0 |
| 11 | L52 | −6.3670 | 0.538 | | 4.4 |
| 12 | Window | Infinite | 0.210 | 1.5168/64.17 | 3.0 |
| 13 | | Infinite | 0.200 | | 3.0 |

TABLE 6

| # | Conic coefficient k | $\alpha_2$ | $\alpha_3$ | $\alpha_4$ | $\alpha_5$ | $\alpha_6$ |
|---|---|---|---|---|---|---|
| 2 | −0.534 | 1.3253E−02 | 2.3699E−02 | −2.8501E−02 | 1.7853E−02 | −4.0314E−03 |
| 3 | −13.473 | 3.0077E−02 | 4.7972E−03 | 1.4475E−02 | −1.8490E−02 | 4.3565E−03 |
| 4 | −10.132 | 7.0372E−04 | 1.1328E−01 | 1.2346E−03 | −4.2655E−02 | 8.8625E−03 |
| 5 | 5.180 | −1.9210E−03 | 2.3799E−01 | −8.8055E−02 | 2.1447E−01 | −1.2702E−01 |
| 6 | 0.000 | 2.6780E−01 | 1.8129E−02 | −1.7323E−02 | 3.7372E−02 | −2.1356E−02 |
| 7 | 10.037 | 2.7660E−01 | −1.0291E−02 | −6.0955E−02 | 7.5235E−02 | −1.6521E−02 |
| 8 | 1.703 | 2.6462E−02 | −1.2633E−02 | −4.7724E−04 | −3.2762E−03 | 1.6551E−03 |
| 9 | −1.456 | 5.7704E−03 | −1.8826E−02 | 5.1593E−03 | −2.9999E−03 | 8.0685E−04 |
| 10 | −6.511 | −2.1699E−01 | 1.3692E−01 | −4.2629E−02 | 6.8371E−03 | −4.1415E−04 |
| 11 | 0.000 | −1.5120E−01 | 8.6614E−02 | −2.3324E−02 | 2.7361E−03 | −1.1236E−04 |

Embodiment 300 provides a FOV of 44 degrees, EFL=6.84 mm, F #=2.80 and TTL=5.904 mm. Thus and advantageously, the ratio TTL/EFL=0.863. Advantageously, the Abbe number of the first lens element is 63.1, and of the third and fifth lens elements is 57.09. The first air gap between lens elements 302 and 304 has a thickness (0.029 mm) which is about 1/10th the thickness $d_2$ (0.254 mm). Advantageously, the Abbe number of the second and fourth lens elements is 23.91. Advantageously, the third air gap between lens elements 306 and 308 has a thickness (1.998 mm) greater than TTL/5 (5.904/5 mm). Advantageously, the fourth air gap between lens elements 208 and 210 has a thickness (0.121 mm) which is less than $1.5 d_5$ (0.6465 mm).

The focal length (in mm) of each lens element in embodiment 300 is as follows: f1=2.687, f2=−6.016, f3=−6.777, f4=8.026 and f5=−5.090. The condition $1.2 \times |f3| > |f2| < 1.5 \times f1$ is clearly satisfied, as $1.2 \times 6.777 > 6.016 > 1.5 \times 2.687$. f1 also fulfills the condition f1<TTL/2, as 2.687<2.952.

Using the data from row #2 in Tables 5 and 6, L1e in lens element 302 equals 0.298 mm, yielding a center-to-edge thickness ratio L11/L1e of 3.08.

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

What is claimed is:

1. A lens system, comprising:
a lens assembly that includes a plurality of refractive lens elements arranged along an optical axis and including, in order from an object side to an image side, a first lens group comprising at least three lens elements, and a second lens group comprising at least two lens elements, the lens assembly having an effective focal length EFL and a total track length TTL;
a stop positioned before the first lens element of the first lens group; and
a window positioned between the plurality of refractive lens elements and an image plane,
wherein all the lens elements are made of plastic,
wherein a largest gap between lens elements $d_{MAX}$ is a gap between the first and second lens groups,
wherein at least one surface of at least one of the plurality of refractive lens elements is aspheric,
wherein TTL/EFL<0.9, $d_{MAX}$/TTL>0.2 and a f number f#<2.9,
wherein a center thickness of each lens element is equal to or larger than 0.2 mm,
and wherein the lens system is included in a mobile device.

2. The lens system of claim 1, wherein $d_{MAX}$ is larger than 2.25 times any other gap between lens elements.

3. The lens system of claim 1, wherein $d_{MAX}$ is larger than 2.5 times any other gap between lens elements.

4. The lens system of claim 1, wherein $d_{MAX}$ is larger than 2.75 times any other gap between lens elements.

5. The lens system of claim 1, wherein a smallest gap between lens elements is $d_{MIN}$, wherein $d_{MIN}$<0.25 mm.

6. The lens system of claim 5, wherein $d_{MIN}$<0.2 mm.

7. The lens system of claim 5, wherein $d_{MIN}$<0.15 mm.

8. The lens system of claim 5, wherein a ratio $d_{MIN}$/$d_{MAX}$<0.2.

9. The lens system of claim 5, wherein a ratio $d_{MIN}$/$d_{MAX}$<0.15.

10. The lens system of claim 5, wherein $d_{MIN}$<0.2 mm, and wherein a ratio $d_{MIN}$/$d_{MAX}$<0.2.

11. The lens system of claim 5, wherein $d_{MIN}$<0.15 mm, and wherein a ratio $d_{MIN}$/$d_{MAX}$<0.15.

12. The lens system of claim 1, wherein the lens assembly includes five refractive lens elements.

13. The lens system of claim 1, wherein f #≥2.8.

14. The lens system of claim 1, wherein a ratio $d_{MAX}$/TTL>0.25.

15. The lens system of claim 1, wherein a ratio $d_{MAX}$/TTL>0.3.

16. The lens system of claim 1, wherein the first lens element of the first lens group has positive refractive power and the second lens element of the first lens group has negative refractive power.

17. The lens system of claim 1, wherein the second lens group includes two adjacent lens elements having opposite refractive powers.

18. The lens system of claim 1, wherein a focal length f1 of the first lens element of the first lens group is smaller than TTL/2.

19. The lens system of claim 1, wherein all lens element surfaces are aspheric.

20. The lens system of claim 1, wherein the mobile device is a smartphone.

* * * * *